(12) United States Patent
Comtois et al.

(10) Patent No.: US 6,497,529 B2
(45) Date of Patent: *Dec. 24, 2002

(54) SNAP-ON RAIL MOUNTED ELECTRICAL DEVICE

(75) Inventors: Patrick Comtois, Dijon (FR); José Garcia, Dijon (FR); Patrick Larcher, Dijon (FR); Alain Moreux, Dijon (FR)

(73) Assignee: Schneider Electric Industries SA, Rueil-Malmaison (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/525,266

(22) Filed: Mar. 13, 2000

(65) Prior Publication Data

US 2002/0136599 A1 Sep. 26, 2002

(30) Foreign Application Priority Data

Mar. 15, 1999 (FR) .............................................. 99 03193

(51) Int. Cl.[7] .................................................. B25G 3/18
(52) U.S. Cl. ........................ 403/325; 403/363; 403/321; 403/326; 403/327; 439/110; 439/116; 439/121; 439/532
(58) Field of Search ................................. 403/326, 325, 403/327, 329, 321, 322.1, 322.4, 257, 286, 338, 363, 374.5, 373, 375; 248/225.11, 295.11, 298.1, 346.04, 694; 439/110, 116, 119, 121, 532, 709; H02B 1/04

(56) References Cited

U.S. PATENT DOCUMENTS

| | | | |
|---|---|---|---|
| 941,096 A | * | 11/1909 | Pugatsky et al. |
| 2,408,547 A | * | 10/1946 | Bertschinger |
| 3,049,367 A | * | 8/1962 | Lashta |
| 3,858,370 A | * | 1/1975 | Halstead |
| 4,671,697 A | * | 6/1987 | Ando et al. |

FOREIGN PATENT DOCUMENTS

| | | | |
|---|---|---|---|
| DE | 24 29 982 | | 1/1976 |
| DE | 2429982 A1 | * | 1/1976 |
| DE | 3316389 A1 | * | 11/1984 |
| DE | 3426019 A1 | * | 2/1985 |
| DE | 35 44 363 | | 6/1987 |
| DE | 3544363 C1 | * | 6/1987 |
| FR | 935949 | * | 7/1948 |
| FR | 2 551 807 | | 3/1985 |
| FR | 2 551807 A1 | * | 3/1985 |
| FR | 342070 A1 | * | 11/1989 |
| GB | 2056179 | * | 3/1981 |
| GB | 2175459 | * | 11/1986 |
| GB | 2205997 | * | 12/1988 |

* cited by examiner

*Primary Examiner*—Lynne H. Browne
*Assistant Examiner*—Michael P Ferguson
(74) *Attorney, Agent, or Firm*—Oblon, Spivak, McClelland, Maier & Neustadt, P.C.

(57) ABSTRACT

A electrical device can be snapped onto a support rail by a compression spring orthogonal to a length of the rail and arranged in a cylindrical housing. The housing opens to the outside, opposite the edge of the rail, via an opening in a top adapted to axial insertion of the spring during its assembly and includes an elastic wall capable of transversal movement, with the wall having a bearing surface on a rail edge side on which the spring is buttressed or having another similar bearing surface that can be activated after the axial insertion of the spring.

6 Claims, 2 Drawing Sheets

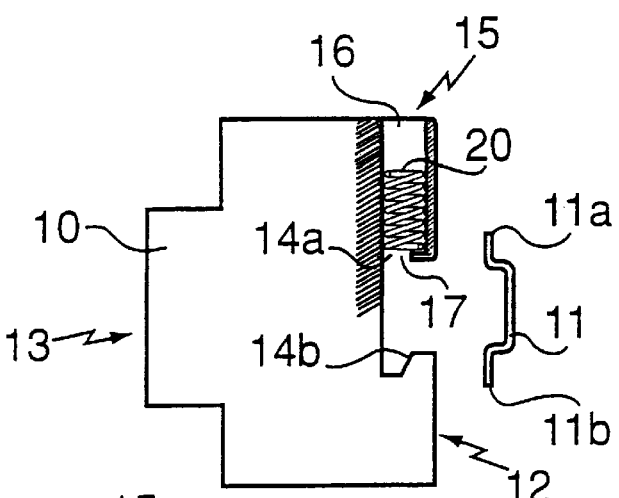
Fig 1
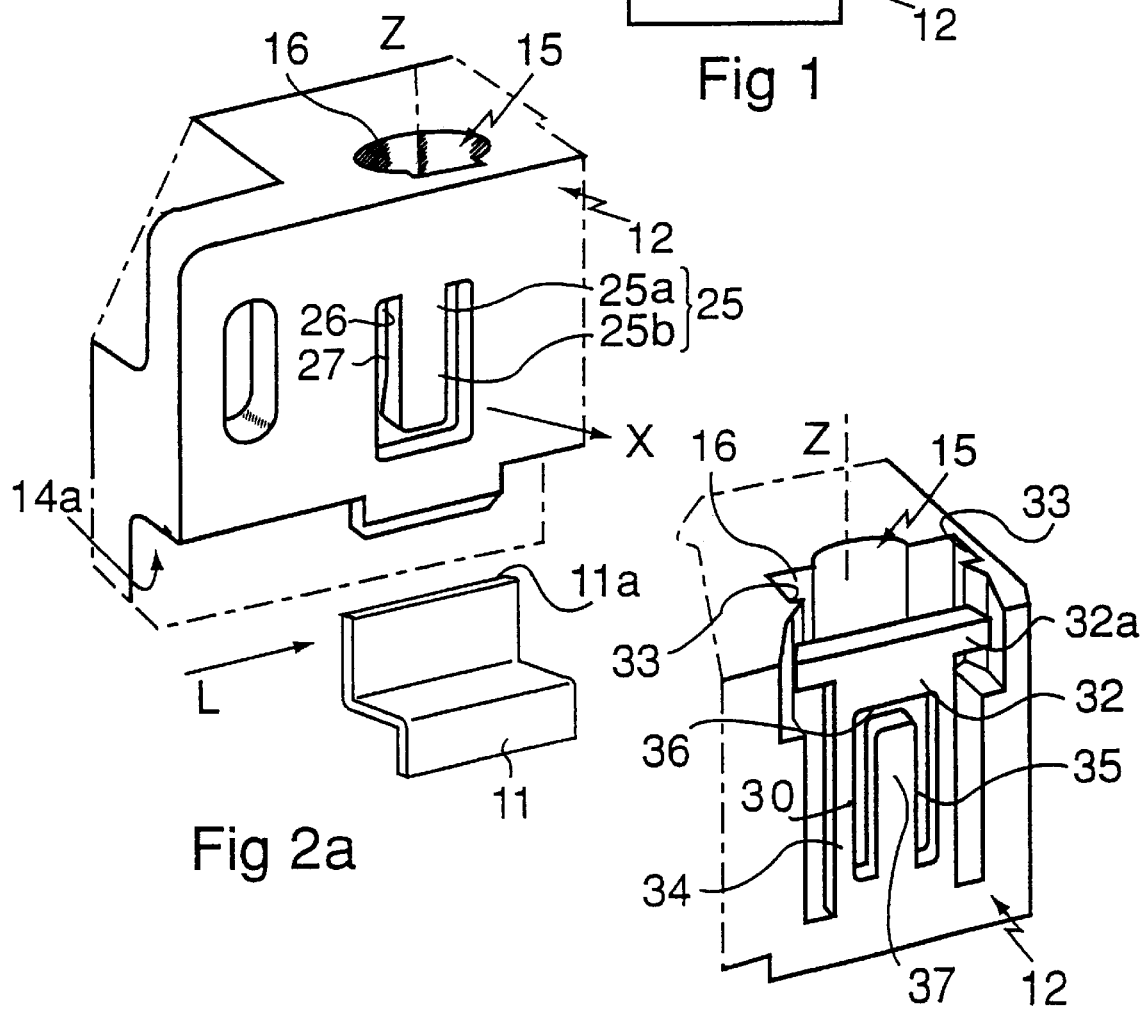
Fig 2a
Fig 2b

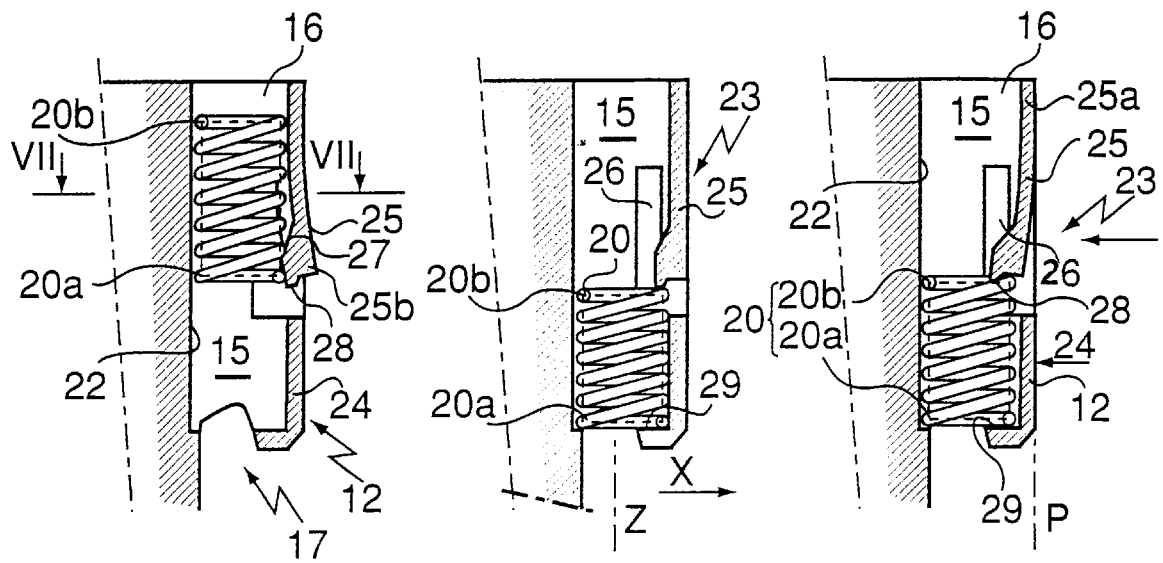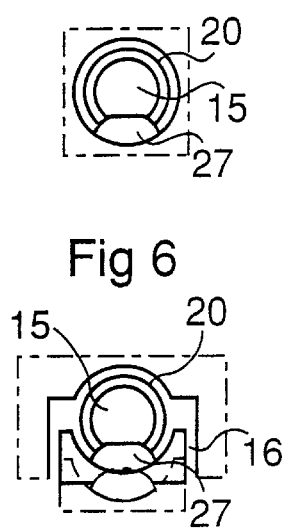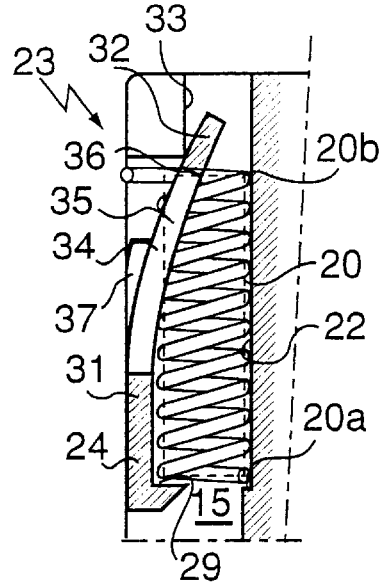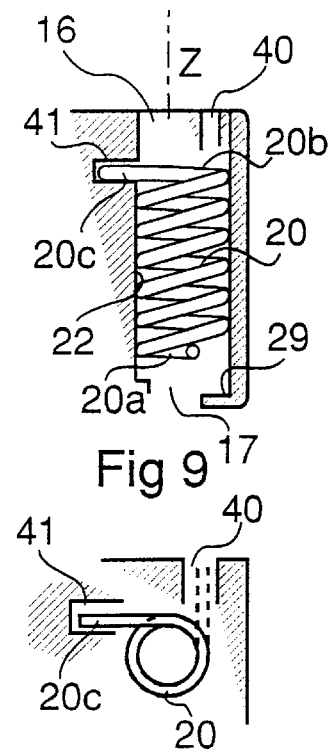

SNAP-ON RAIL MOUNTED ELECTRICAL DEVICE

BACKGROUND OF THE INVENTION

1. Field of the Invention

This invention relates to an electrical device comprising a support rail equipped with a locking end, a part that can be snapped onto the support rail and that includes, in a rear panel, at least one compression spring with an axis orthogonal to the length of the support rail, arranged in a housing which opens onto the locking end of the support rail and offers a stop for the spring.

2. Discussion of the Related Art

Snapping electrical devices onto rails such as standardised sections is well known. The use of helical compression springs that can be applied directly onto the edge of the rail is also known, e.g. according to the document FR-2 551 807. The springs are generally assembled in their housing by inserting them via an opening on the rear of the device by forcing walls of the housing. The fact that the housing remains open at the rear of the device results in a risk of the spring being extracted from its housing, when non-axial strain is applied on the spring. Such non-axial strain is frequently encountered when devices are assembled or disassembled.

SUMMARY OF THE INVENTION

The purpose of the invention is to prevent the risk of extraction of the compression springs used in electrical devices to lock them onto support rails such as standardised sections, in a low production cost solution.

According to the invention, the housing opens onto the outside, opposite the rail locking edge, via an opening used for the axial insertion of the spring for its assembly and the housing comprises a spring support bearing surface opposite the stop, this bearing surface being inactive during the insertion of the spring and rendered active after the insertion of the spring.

The bearing surface may be provided either on an elastic housing wall co-operating with a plain helical spring, e.g. by means of a ramped tongue and locking jaw or by means of a locking frame, or on a cavity of the device casing co-operating with a special helical spring, with, in this case, this spring being equipped with a transversal catch set to the locking position by a rotation.

BRIEF DESCRIPTION OF THE DRAWINGS

The description will be made below using non-restrictive applications of the invention, illustrated by the drawings appended.

FIG. 1 is a vertical schematic view of an electrical device according to the invention.

FIGS. 2*a* and 2*b* are perspective representations of two variants of the invention, before assembly of the springs.

FIGS. 3 to 5 are enlarged sections of a spring housing, in the first variant, during the assembly of the spring, before engagement of the jaw and in the operating position, respectively.

FIGS. 6 and 7 show the top view and section of the housing according to plane VII—VII of FIG. 5.

FIG. 8 is a section of the second variant.

FIGS. 9 and 10 show a third variant.

DETAILED DESCRIPTION OF THE INVENTION

The electrical device illustrated in the figures is a low-voltage device equipped with an insulating casing 10, e.g. an insulating body or base, capable of snapping onto a top support section rail 11. At its rear panel 12, i.e. on the side opposite its front 13 accessible to the operator, the casing 10 comprising two recesses 14*a*, 14*b* in which the ends 11*a*, 11*b* of the rail 11 can be inserted. Two helical springs 20 are each arranged in a cylindrical housing 15 provided in the casing 10, near its rear panel 12. Each spring 20 comprises a bottom end spiral 20*a* and a top end spiral 20*b* (see FIGS. 3 to 5).

Each housing 15 comprises an axis Z orthogonal to the general direction L of the rail; the housing 15 opens onto the recess 14*a* via an opening 17 (see FIGS. 3 and 5) in such a way that the spring 20, protruding slightly in the recess 14*a*, can lock against the edge of the rail with its bottom spiral 20*a*; the housing 15 opens to the top via an approximately circular opening 16 enabling the assembly of the spring.

In the application in FIGS. 2*a* and 3 to 7, the housing 15 is delimited at the front by a rigid wall 22 and at the rear by an elastic wall 23 and a rigid wall 24. The elastic wall 23 is located at the top, while the rigid wall 24 is located at the bottom.

The elastic wall 23 is composed of a tongue 25 attached to the casing 10 at its top end 25*a* and is able to bend at its bottom end 25*b*. The tongue 25 is detached for this purpose from the rear panel 12 by lateral slots 26. The bottom end 25*b* of the tongue 25 comprises a ramp 27 and a bearing surface composed of a jaw 28 that can be locked on the top end spiral 20*b* of the spring 20. Therefore, in the operating position (FIG. 5), the spring 20 is buttressed at the top end spiral 20*b* on the jaw 28 of the elastic wall 23 and at the bottom end spiral 20*a* on a stop 29 of the rigid wall 24 and is contained laterally by the rigid walls 22, 24. The tongue 25 is approximately in line with the rigid wall 24 to help define an appropriate attachment plane P at the rear panel 12 of the casing 10.

In the application of FIGS. 2*b* and 8, the elastic wall 23 forms a frame 30 embedded at its bottom end 31, while its top end forms a crosspiece 32 which is ended laterally with tips 32*a* intended to lock against shoulders 33 adjacent to the housing 15. The frame 30 comprises two legs 34 leaving a central space 35 between them in which the spring is housed, abutting at the top against a bearing surface 36 of the frame and at the bottom against the stop 29. The space 35 also comprises a catch 37 forming a lateral support for the spring.

In the first variant, the spring 20 is assembled as shown in FIGS. 3 to 5. As seen in FIG. 3, it is inserted via the circular opening 16 and lowered by pushing into the housing 15 until its bottom spiral 20*a* rests on the ramp 27. Due to the ramp 27, when the spring 20 continues to move down, it deflects the elastic tongue 25 in the direction X perpendicular to the axis Z (see dotted line on FIG. 7) and then stops against the stop 29 (FIG. 4). Then, the jaw 28 is pushed back in the opposite direction of X (following the arrow shown in FIG. 5) so that the top spiral 20*b* of the spring 20 locks against the jaw 28 while the spring 20 and the tongue 25 remain mutually buttressed in the operating position. In this position, the elastic wall 23 is approximately in line with the rigid wall 24, with the bottom end 25*b* of the tongue 25 slightly retracted with reference to the attachment plane P.

In the second variant, suitable for longer springs, the frame 30, initially in the position drawn in FIG. 2*b*, is folded in the opposite direction of X to the position in FIG. 8, where the tips 32*a* lock against the shoulders 33, while the spring remains constrained in the space 35 of the frame.

The pressure exerted by the device on the rail 11 when the device is snapped on is conveyed by a slight compression of the spring 20, with the corresponding force taken up by the elastic wall 23 on which the spring 20 is buttressed, at the jaw 28 of the bearing surface 36.

In the third variant (FIGS. 9 and 10), the spring 20 comprises a top spiral 20b prolonged by a transversal catch 20c and the casing comprises a slot 40 which is directed parallel to the direction Z and communicates with the housing 15. The catch 20c slides into the slot when the spring is inserted into the housing and then, by pivoting the spring around its axis (merged with the Z axis), is engaged under a bearing surface 41 adjacent to the housing so as to remain captive in the housing.

What is claimed is:

1. Electrical device comprising:

a support rail equipped with a locking end, a part that can be snapped onto the support rail and that includes, in a rear panel, at least one compression spring which can be applied onto the locking end with an axis orthogonal to a length of the support rail, with the spring arranged in a housing which opens onto the locking end while having a stop for the spring, wherein the housing opens to the outside, opposite the locking end, via an opening to a top end used for axial insertion of the spring for assembly, and wherein the housing has a bearing surface opposite the stop on which bearing surface a top end spiral of the spring can be applied, said bearing surface being inactive during the axial insertion of the spring and being rendered active by being applied against the spring after the axial insertion of the spring.

2. Device according to claim 1, wherein the bearing surface is provided on a tongue which forms an elastic wall of the housing and has a ramp that can be actuated by a locking spiral of the spring when said spring is inserted in the opening and is pushed into the housing.

3. Device according to claim 2, wherein the bearing surface is formed by a jaw of the tongue which is locked on the top end spiral that is located at one end of the spring opposite an end at which the locking spiral is located.

4. Device according to claim 1, wherein the housing is delimited at the rear panel by an elastic wall and by a rigid wall, said elastic wall being, in a spring support position, approximately in line with the rigid wall.

5. Device according to claim 1, wherein the housing is defined at the rear panel by an elastic wall composed of a frame having a central space provided for passage of the spring, said frame being bent forwardly after the axial insertion of the spring to lock against shoulders in the housing.

6. Device according to claim 1, wherein the top end spiral is prolonged by a transversal catch liable to slide into a slot in the housing when the spring is inserted and then is applied against the bearing surface by rotating the spring around the axis.

* * * * *